US011935184B2

(12) United States Patent
Garcia (10) Patent No.: US 11,935,184 B2
(45) Date of Patent: Mar. 19, 2024

(54) INTEGRATION OF AMBIENT LIGHT INTO GRAPHICS OBJECTS IN A THREE-DIMENSIONAL SPACE

(71) Applicant: IMVU, LLC, Redwood City, CA (US)

(72) Inventor: Llorenç Marti Garcia, Mountain View, CA (US)

(73) Assignee: IMVU, LLC, Redwood City, CA (US)

( * ) Notice: Subject to any disclaimer, the term of this patent is extended or adjusted under 35 U.S.C. 154(b) by 0 days.

(21) Appl. No.: 17/674,489

(22) Filed: Feb. 17, 2022

(65) Prior Publication Data

US 2023/0260205 A1 Aug. 17, 2023

(51) Int. Cl.
*G06T 15/50* (2011.01)
(52) U.S. Cl.
CPC .................. *G06T 15/50* (2013.01)

(58) Field of Classification Search
CPC ....... G06T 15/50; G06T 15/506; G06T 15/60; G06T 15/55; G06T 17/00; G06T 19/003; G06T 19/00; G06T 19/20
See application file for complete search history.

(56) References Cited

U.S. PATENT DOCUMENTS

| 10,210,664 B1* | 2/2019 | Chaturvedi | G06Q 30/0643 |
| 2016/0210934 A1* | 7/2016 | Halfman | G09G 5/06 |
| 2021/0090338 A1* | 3/2021 | Chen | G06T 7/90 |

* cited by examiner

*Primary Examiner* — Hau H Nguyen
(74) *Attorney, Agent, or Firm* — DLA Piper LLP (US)

(57) ABSTRACT

An ambient lighting engine and an ambient lighting method are disclosed. A base graphics component is transformed into an ambient-lit graphics component based on ambient color values determined along multiple axes in 3D space. The ambient color values can be calculated in real-time. Optionally, the calculated ambient color values can be associated with a location in 3D space and cached for usage at a later time for pixels at or near that same location.

20 Claims, 12 Drawing Sheets

INTEGRATION OF AMBIENT LIGHT INTO GRAPHICS OBJECTS IN A THREE-DIMENSIONAL SPACE

TECHNICAL FIELD

Numerous embodiments are disclosed for integrating ambient light into graphics objects in a three-dimensional (3D) space.

BACKGROUND OF THE INVENTION

Graphics technology is continually evolving. Typically, a computing device executes software using a central processing unit (CPU) or a graphics processing unit (GPU) to generate graphics on a display of the computing device. As graphics technology improves, users increasingly expect and demand graphics that are realistic and life-like.

In many prior art applications, a graphics object has a fixed color scheme that remains in place regardless of the environment that surrounds that graphics object in the 3D space. For example, a light-colored shirt will be displayed with the same color whether it appears in sunlight or darkness. The user immediately will perceive that the graphics object is very different than real-life objects in this respect. For example; a light-colored shirt in real life will appear brighter during the daytime than in the middle of the night.

What is needed are techniques for integrating ambient light into graphics objects in a 3D space.

SUMMARY OF THE INVENTION

An ambient lighting engine and an ambient lighting method are disclosed. A base graphics component is transformed into an ambient-lit graphics component based on ambient color values determined along multiple axes in 3D space. The ambient color values can be calculated in real-time. Optionally, the calculated ambient color values can be associated with a location in 3D space and cached for usage at a later time for pixels at or near that same location.

DETAILED DESCRIPTIONS OF THE PREFERRED EMBODIMENTS

Figure 1:
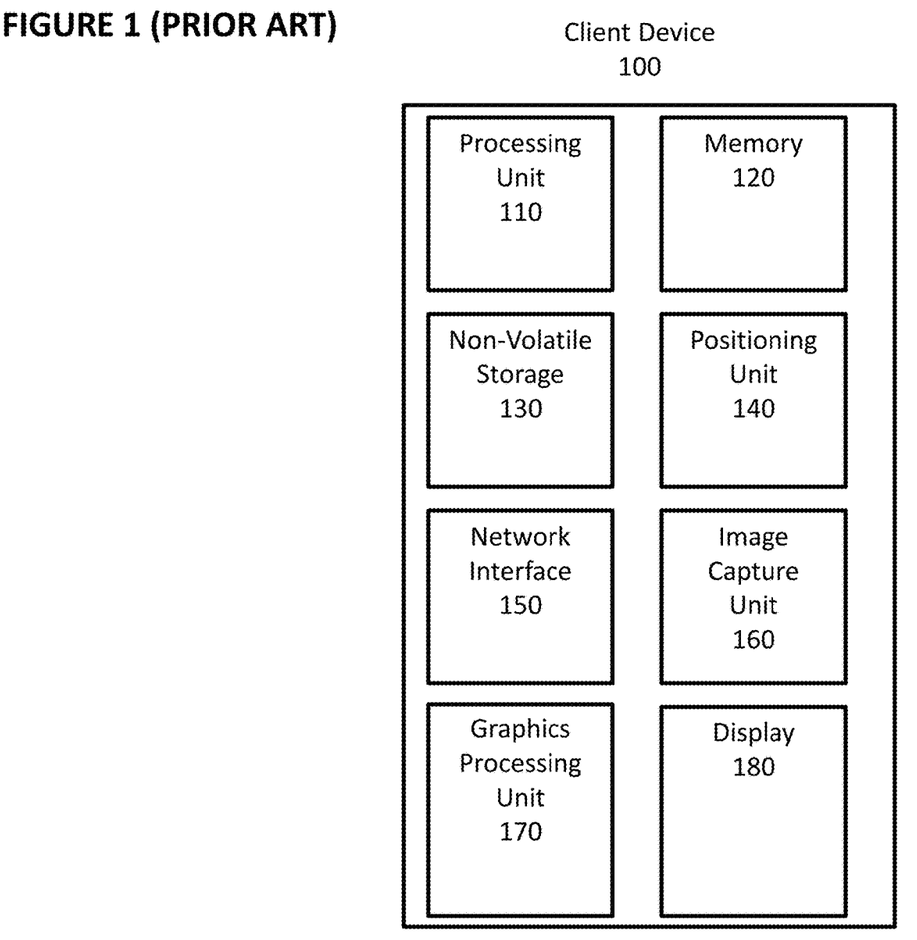
FIG. 1 depicts prior art hardware components of a client device.

FIG. 1 depicts hardware components of client device 100, which is a computing device such as a smartphone, notebook computer, tablet, desktop computer, gaming unit, wearable computing device such as a watch or glasses, or any other computing device. These hardware components are known in the prior art. Client device 100 is a computing device that comprises processing unit 110, memory 120, non-volatile storage 130, positioning unit 140, network interface 150, image capture unit 160, graphics processing unit 170, and display 180.

Processing unit 110 optionally comprises a microprocessor with one or more processing cores that can execute instructions. Memory 120 optionally comprises DRAM or SRAM volatile memory. Non-volatile storage 130 optionally comprises a hard disk drive or flash memory array. Positioning unit 140 optionally comprises a GPS unit or GNSS unit that communicates with GPS or GNSS satellites to determine latitude and longitude coordinates for client device 100, usually output as latitude data and longitude data. Network interface 150 optionally comprises a wired interface (e.g., Ethernet interface) or wireless interface (e.g., 3G, 4G, 5G, GSM, 802.11, protocol known by the trademark BLUETOOTH, etc.). Image capture unit 160 optionally comprises one or more standard cameras (as is currently found on most smartphones and notebook computers). Graphics processing unit 170 optionally comprises a controller or processor for generating graphics for display. Display 180 displays the graphics generated by graphics processing unit 170, and optionally comprises a monitor, touchscreen, or other type of display.

Figure 2:
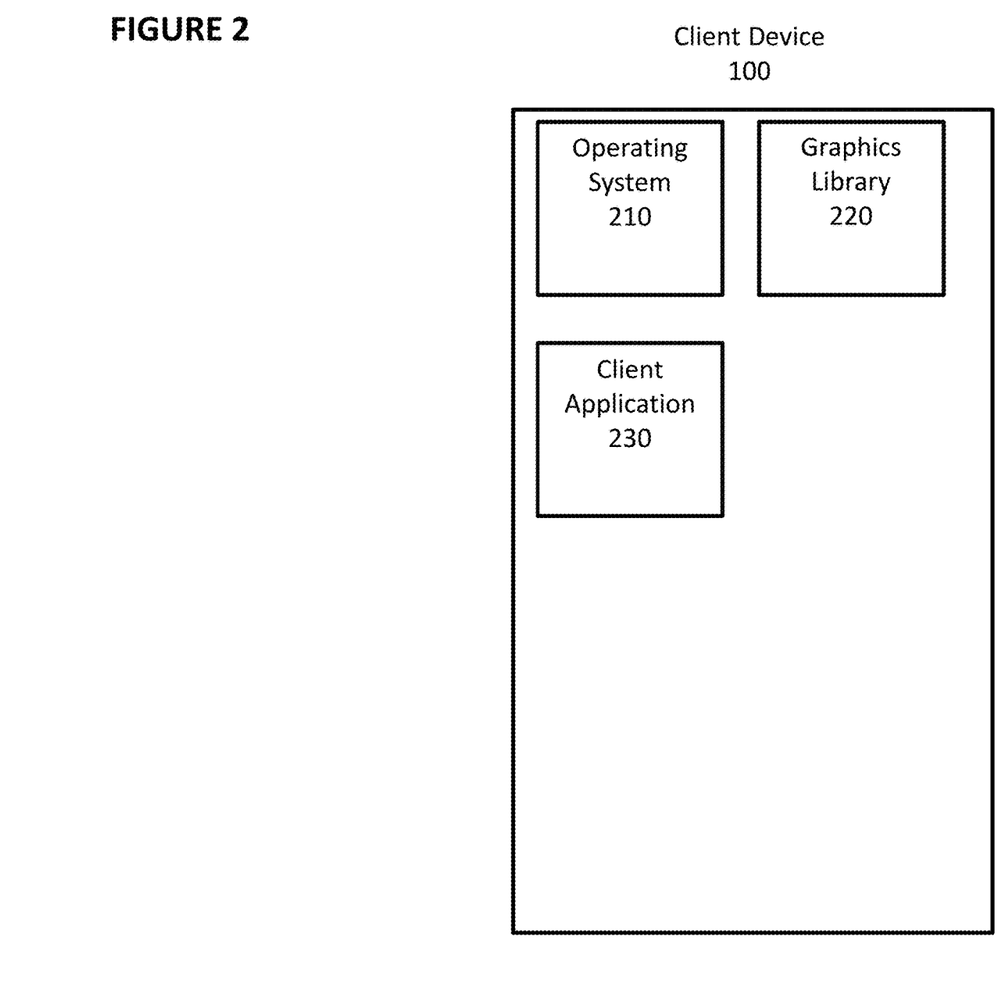
FIG. 2 depicts software components of a client device.

FIG. 2 depicts software components of client device 100. Client device 100 comprises operating system 210 (such as the operating systems known by the trademarks WINDOWS, LINUX, ANDROID, IOS, or other operating system), graphics library 220 (such as OpenGL ES 3.0), and client application 230. Client application 230 comprises lines of software code executed by processing unit 110 and/or graphics processing unit. Client application 230 utilizes graphics library 220. Client application 230 forms an important component of the inventive aspect of the embodiments described herein, and client application 230 is not known in the prior art.

Figure 3:
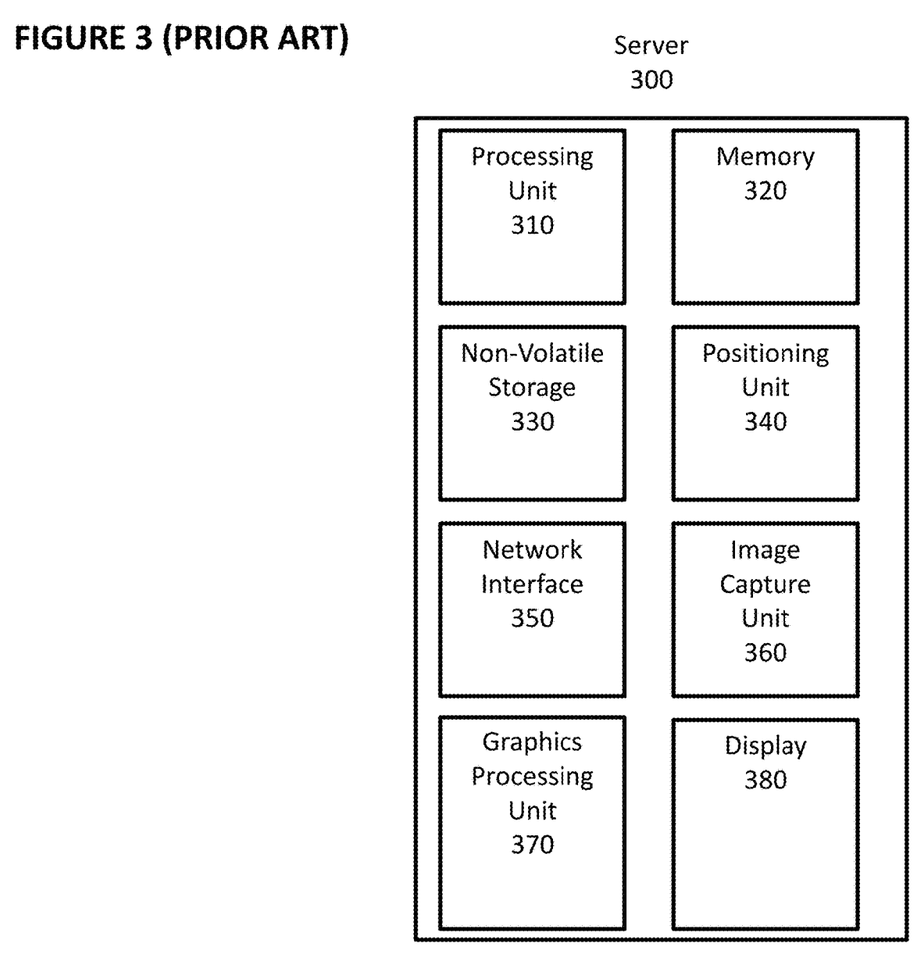
FIG. 3 depicts prior art hardware components of a server.

FIG. 3 depicts hardware components of server 300. These hardware components are known in the prior art. Server 300 is a computing device that comprises processing unit 310, memory 320, non-volatile storage 330, positioning unit 340, network interface 350, image capture unit 360, graphics processing unit 370, and display 380.

Processing unit 310 optionally comprises a microprocessor with one or more processing cores that can execute instructions. Memory 320 optionally comprises DRAM or SRAM volatile memory. Non-volatile storage 330 optionally comprises a hard disk drive or flash memory array. Positioning unit 340 optionally comprises a GPS unit or GNSS unit that communicates with GPS or GNSS satellites to determine latitude and longitude coordinates for server 300, usually output as latitude data and longitude data. Network interface 350 optionally comprises a wired interface (e.g., Ethernet interface) or wireless interface (e.g., 3G, 4G, 5G, GSM, 802.11, protocol known by the trademark "Bluetooth," etc.). Image capture unit 360 optionally comprises one or more standard cameras (as is currently found on most smartphones and notebook computers). Graphics processing unit 370 optionally comprises a controller or processor for generating graphics for display. Display 380 displays the graphics generated by graphics processing unit 370, and optionally comprises a monitor, touchscreen, or other type of display.

Figure 4:
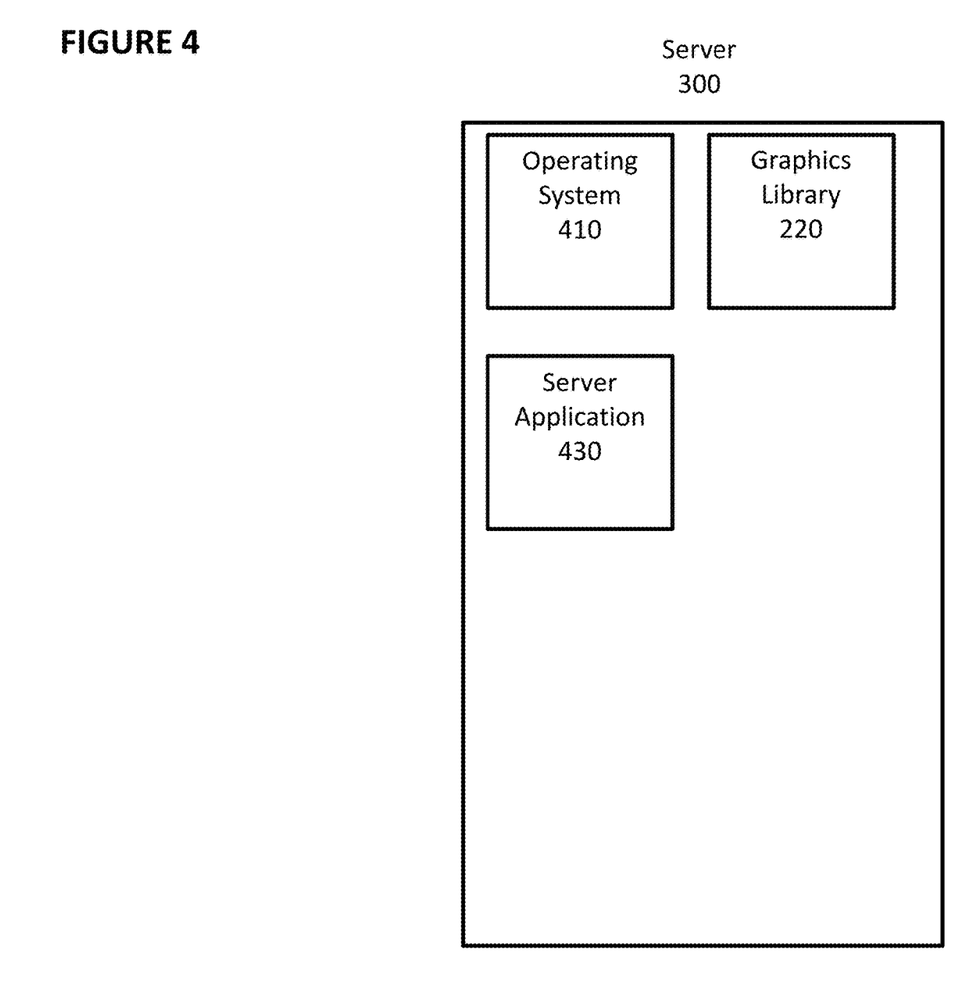
FIG. 4 depicts software components of a server.

FIG. 4 depicts software components of server 300. Server 300 comprises operating system 410 (such as the server operating systems known by the trademarks "WINDOWS SERVER," "MAC OS X SERVER," "LINUX," or others), graphics library 220, and server application 430. Server application 430 comprises lines of software code executed by processing unit 310 and/or graphics processing unit, and server application 430 is designed specifically to interact with client application 230. Server application 430 forms an important component of the inventive aspect of the embodiments described herein, and server application 430 is not known in the prior art.

Figure 5:
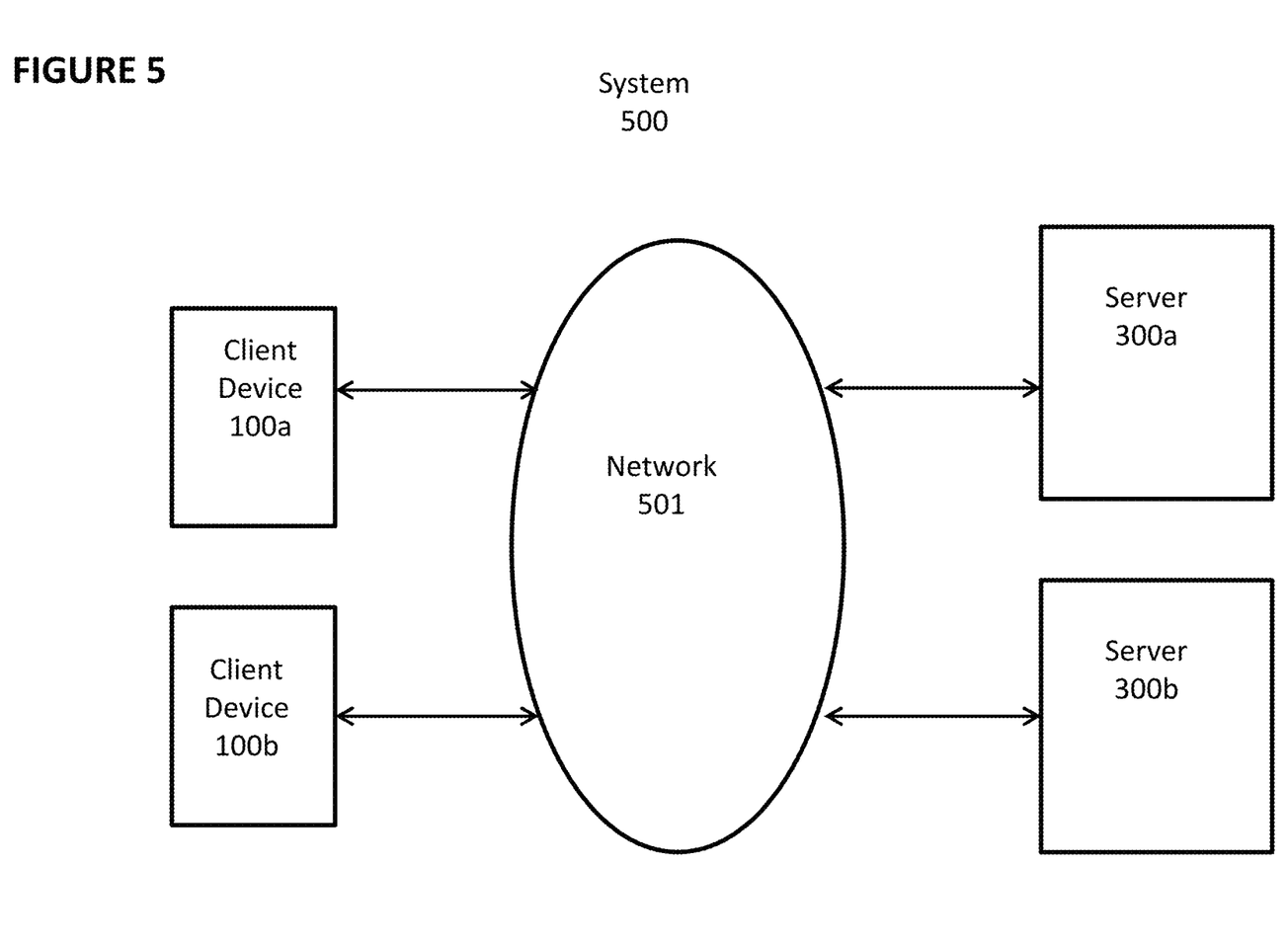
FIG. 5 depicts a system comprising one or more servers and one or more client devices.

FIG. 5 depicts exemplary system 500, which comprises one or more servers 300 and one or more client devices 100. In the example shown, there are two instantiations of server 300 (servers 300a and 300b) and two instantiations of client device 100 (client devices 100a and 100b), which communicate over network 501 using their respective network interfaces 150 and 350. These are exemplary devices, and it is to be understood that any number of different instantiations of server 300 and client device 100 can be used.

Figure 6:
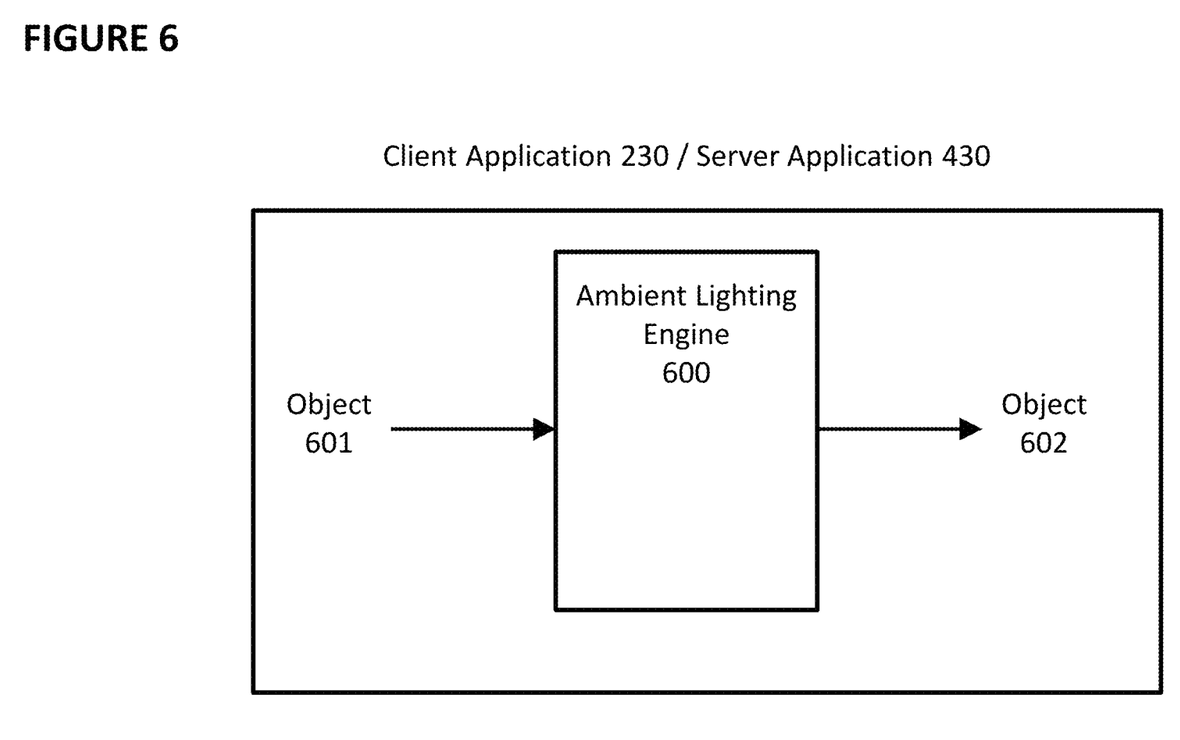
FIG. 6 depicts an ambient lighting engine.

FIG. 6 depicts ambient lighting engine 600. Ambient lighting engine 600 can be implemented solely in client application 230, solely in server application 430, or in both client application 230 and server application 430 where various functions are distributed between client application 230 and server application 430. Ambient lighting engine 600 receives object 601 as an input. Ambient lighting engine 600 then performs the transformations discussed below on object 601 to generate object 602, which it outputs.

Figure 7:
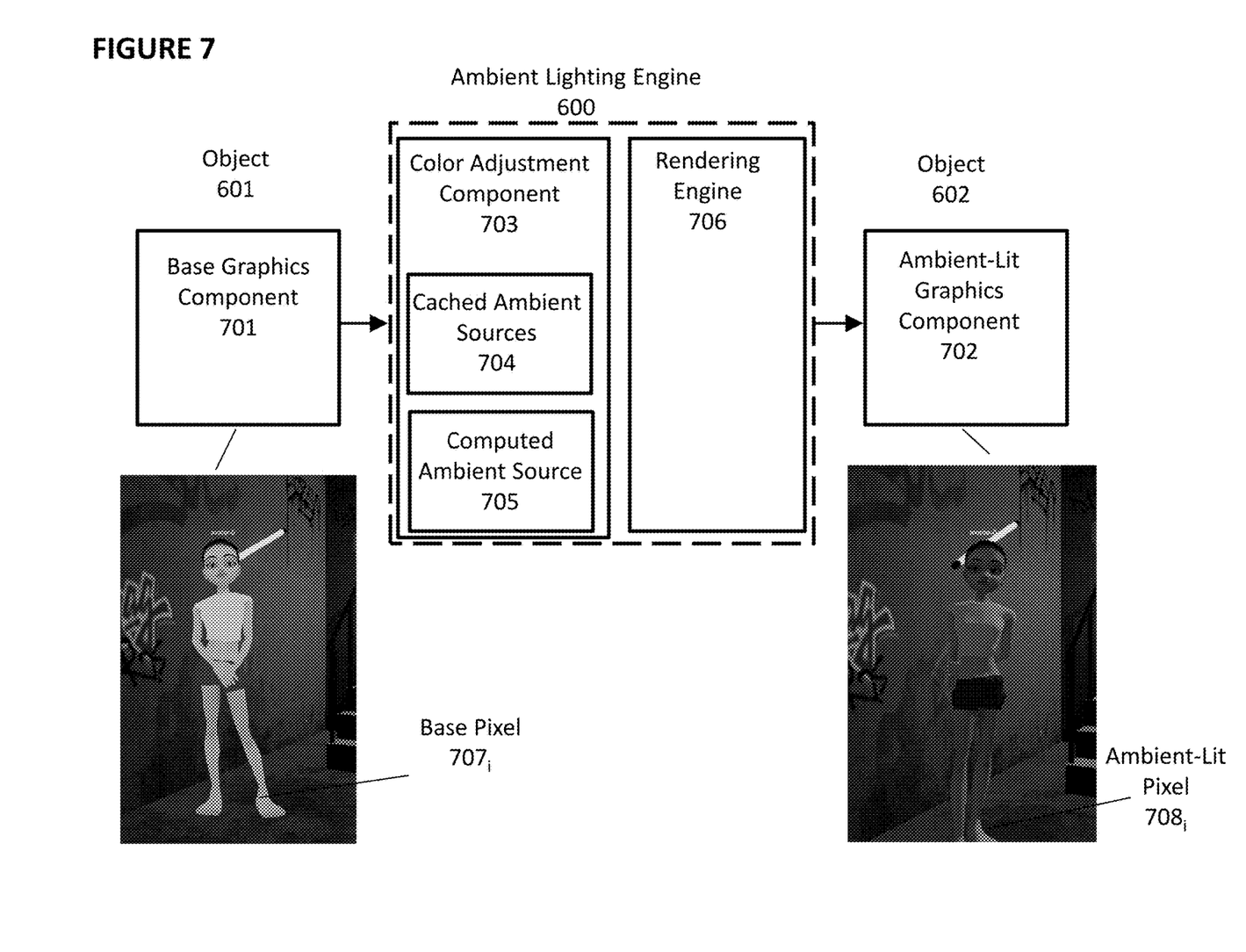
FIG. 7 depicts an ambient lighting engine.

FIG. 7 depicts additional detail regarding ambient lighting engine 600. In this example, object 601 comprises base graphics component 701, which here is an avatar as shown. The avatar is wearing a white shirt that is very bright even though the surrounding area is very dark. In real life, a white shirt would be much darker than the one shown due to the interactions with the ambient light or the surrounding environment. Base graphics component 701 comprises a plurality of pixels in 3D space, including exemplary base pixel 707i.

Ambient lighting engine 600 is provided with base graphics component 701 to determine if adjustments should be made based on the ambient light of the environment surrounding the graphics object in 3D space.

Ambient lighting engine 600 comprises color adjustment component 703 and rendering engine 706. Color adjustment component 703 has access to cached ambient sources 704 and also can generate computed ambient source 705 in real-time. Cached ambient sources 704 comprise computed ambient sources 705 that were previously generated and associated with location information in 3D space. The usage of cached ambient sources 704 are discussed in greater detail below with reference to FIG. 11.

Figure 8:
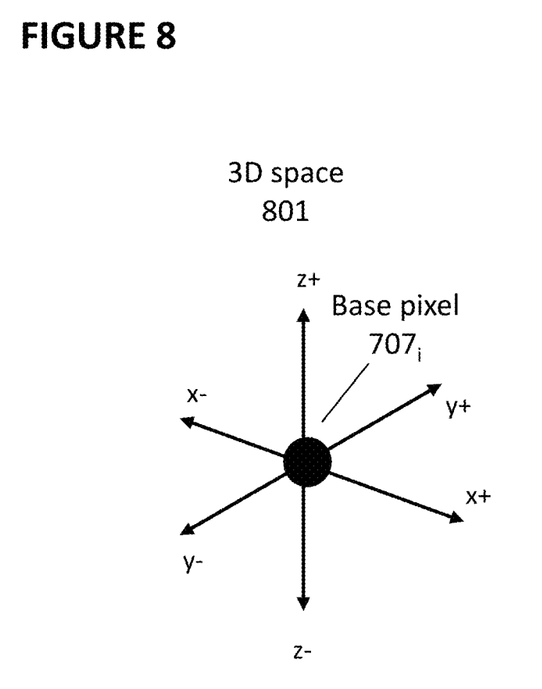
FIG. 8 depicts a 3D space.

With reference to FIG. 8, base graphics component 701 exists in 3D space 801, which is a graphical "universe" that can be displayed to a user. Each pixel in 3D space 801 has a unique location that can be identified using coordinates along the x, y, and z axes. Similarly, from each pixel, such as base pixel $707_i$, one can determine the ambient colors that are visible in the positive and negative directions of each axes. Thus, in FIG. 8, one can determine ambient colors in the x+, x−, y+, y−, z+, and z− directions from base pixel $707_i$.

Figure 9:
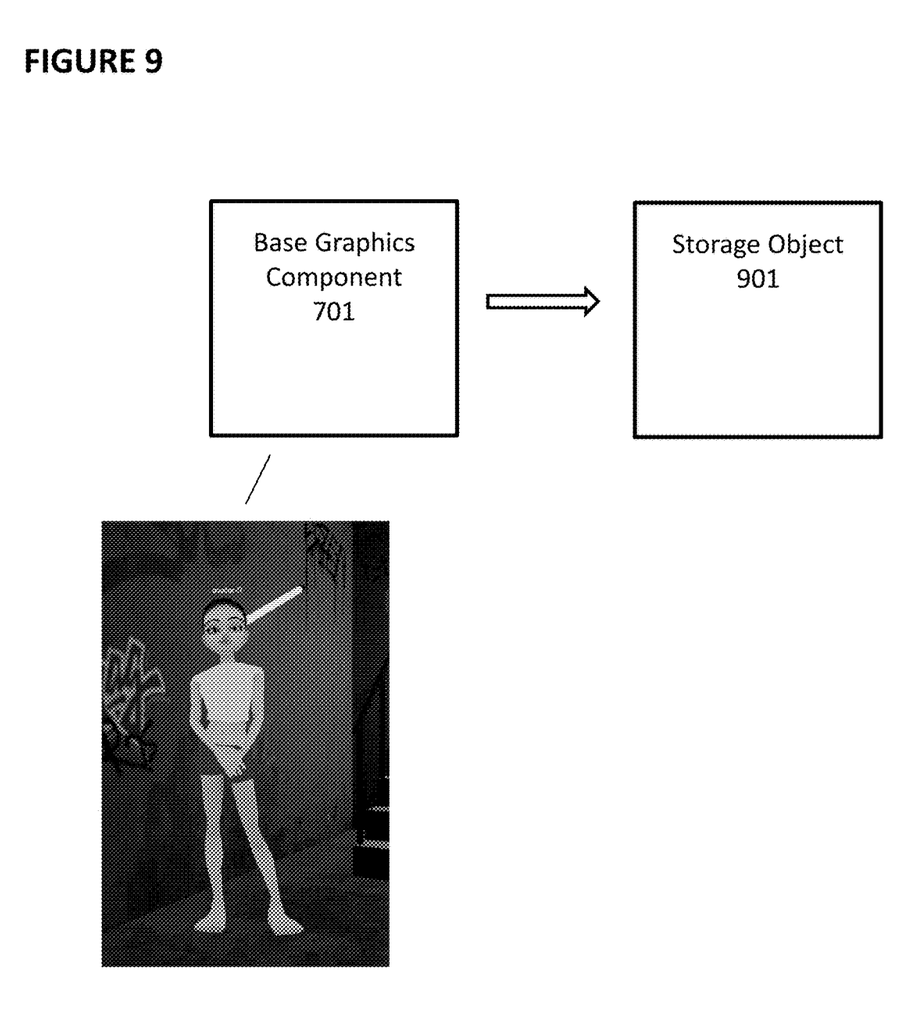
FIG. 9 depicts a base graphics component and an associated storage object.

In FIG. 9, ambient lighting engine 600 creates storage object 901 for base graphics component 701. Specifically, each pixel in base graphics component 701 will have a set of pixel data in storage object 901 comprising 7 colors: x+, x−, y+, y−, z+, z−, and global ambient color. The first 6 colors are the determined ambient colors in the direction of the 6 axes. The seventh data item is a global ambient color, which can be used to provide macro changes to the 3D space, for example, to darken all visible pixels to simulate the setting of the sun.

Figure 10:
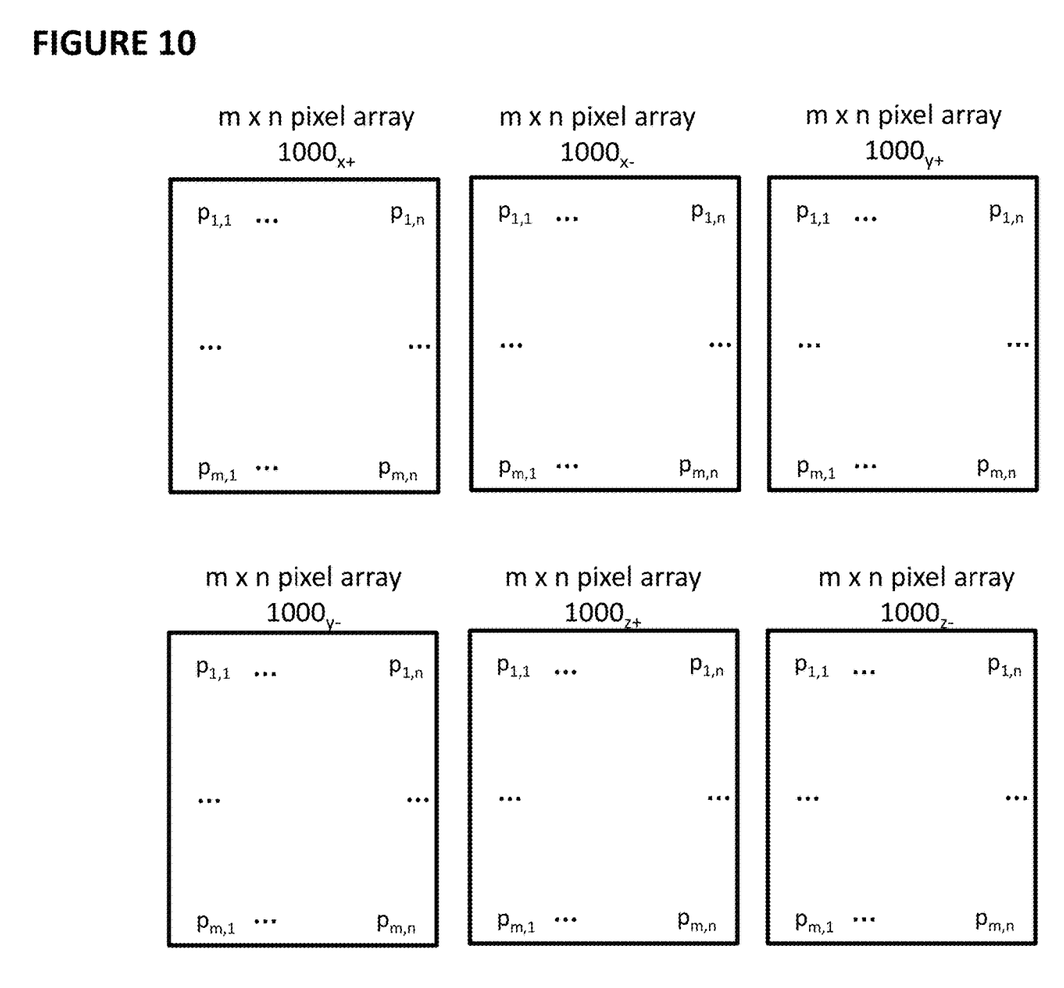
FIG. 10 depicts color calculations in the direction of six axes.

In FIG. 10, for each pixel in base graphics component 701, ambient lighting engine 600 captures a snapshot in the direction of the six axes, where the snapshot is an m×n array of pixels. Optionally, m=n. For example, a 32×32 array can be captured. The captured array in each direction will be reduced into a single pixel value using known functions. For example, using the downsample function, the array can be divided into units of 2 pixels×2 pixels, where an average is calculated of the 4 pixels to generate a single value. This will reduce a 32×32 array to a 16×16 array of the new, calculated values. This process can be repeated until a 1×1 pixel is all that remains, which can be considered the ambient color in the direction of that axis.

With reference again to FIGS. 7, for each pixel in base graphics component 701, such as base pixel 707i, once a color component has been determined in all six directions, the pixel will be transformed into ambient-lit pixel, such as ambient-lit pixel 708i which is the transformed version of base pixel 707i, using those 6 colors and the global ambient color using the function makeFragmentAmbientFromCube. This is performed for each pixel in base graphics component 701 to generate ambient-lit graphics component 702, which here is the transformed avatar as shown. The avatar's white shirt is now darkened in response to the ambient light in the 3D space, which makes the appearance much more like real life.

It can be appreciated that calculating an ambient-lit pixel for each base pixel in base graphics component 701 will be extremely calculation-intensive and will consume significant processing resources in processing unit 110, graphics processing unit 170, processing unit 310, and/or graphics processing unit 370. There are many ways to reduce the number of computations required while still achieving the visual goal for the user.

Figure 11:
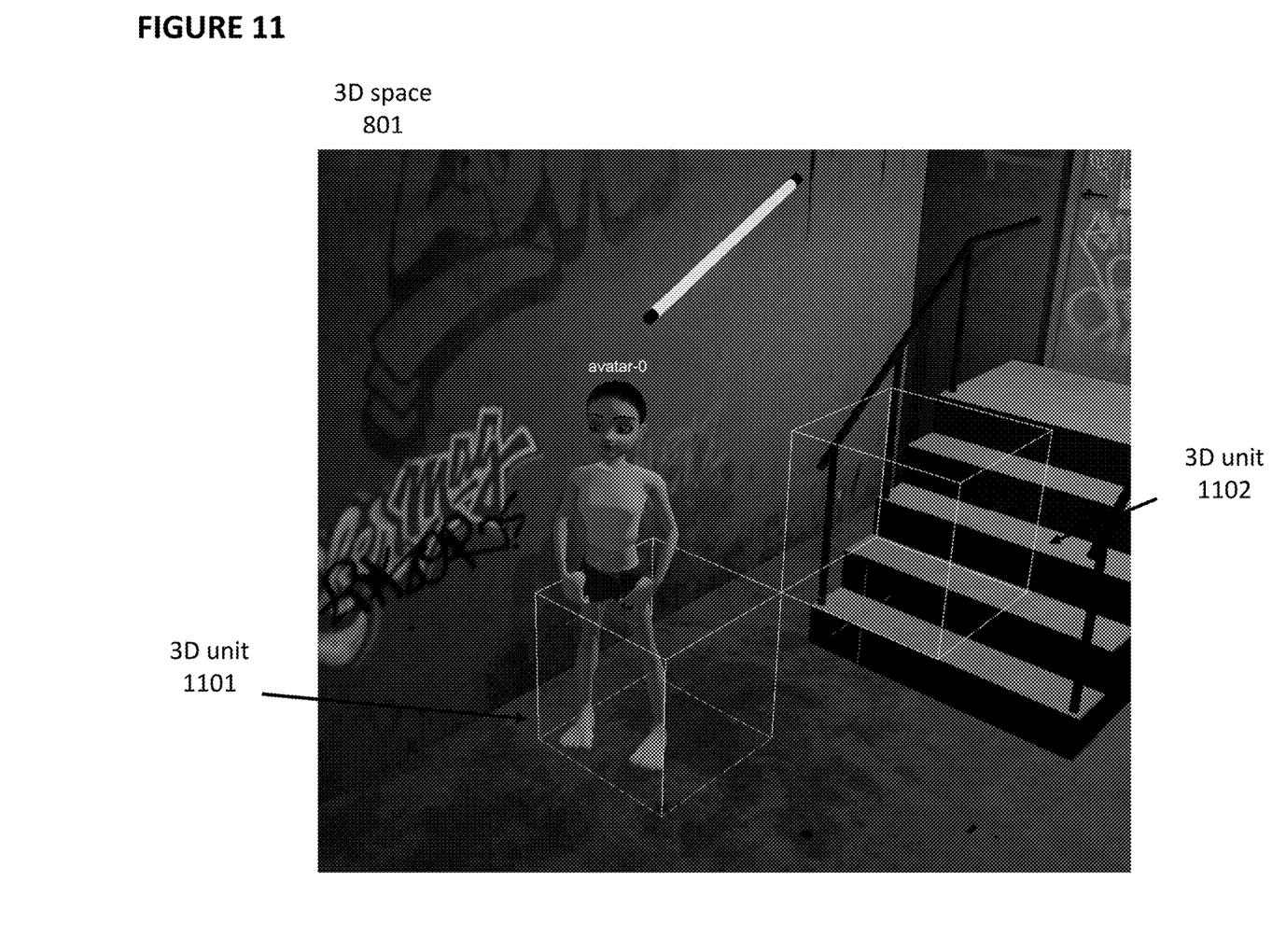
FIG. 11 depicts a 3D space divided into 3D units.

With reference to FIG. 11, 3D space 801 can be divided into a plurality of 3D units, such as 3D units 1101 and 1102. Specifically, the space is physical subdivided into smaller units, such as a series of cubes. The calculations described above can be performed once for each 3D unit such that six color values are calculated for the 3D unit and stored as a cached ambient source 704. Thereafter, those six color values can be used for any base pixel that is located in that 3D unit. This will drastically reduce the number of calculations require.

Optionally, computer ambient source 705 can be computed for some, but not all, of the pixels in base graphics component 701. For example, computer ambient source 705 can be computed for a sample of the pixels in base graphics component, and the calculated computer ambient source 705 can then be applied to the sampled pixel plus all pixels in the surrounding vicinity.

Another efficiency is to perform the transformations on only one graphics object at a time. For example, if two avatars enter 3D space 801 at the same time, the transformation can be performed on one avatar first, and then on the other avatar at a later time. For example, in a 20-frame sequence, the first avatar can be transformed during the first 10 frames while the second avatar can be transformed during the second 10 frames. This essentially spreads out the processing demand over time.

Figure 12:
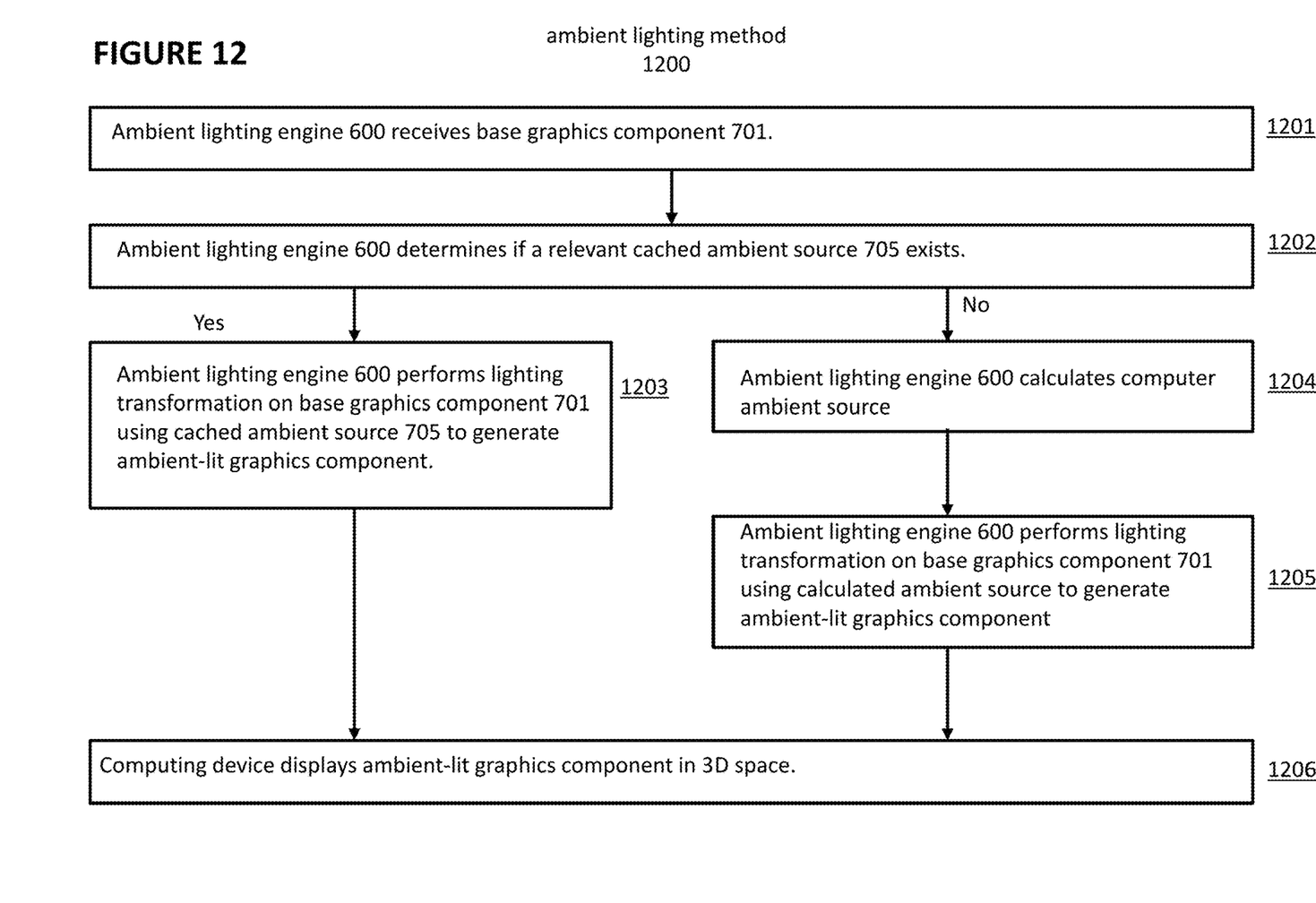
FIG. 12 depicts an ambient lighting method.

FIG. 12 depicts ambient lighting method 1200 using the techniques described above. Ambient lighting engine 600 receives base graphics component 701 (step 1201). Ambient lighting engine 600 determines if a cached ambient source 705 exists for the location in 3D space of base graphics component 701 or a portion thereof (step 1202). If yes, ambient lighting engine 600 performs lighting transformation on base graphics component 701 or a portion thereof using cached ambient source 705 to generate ambient-lit graphics component (step 1203). If no, ambient lighting engine 600 calculates computer ambient source (step 1204), and ambient lighting engine 600 performs lighting transformation on base graphics component 701 or a portion thereof using calculated ambient source to generate ambient-lit graphics component (step 1205). Following step 1203 or step 1205, computing device displays ambient-lit graphics component in 3D space (step 1206).

Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between).

What is claimed is:

1. An ambient lighting method, comprising:
   receiving, by an ambient lighting engine, a base graphics component;
   performing a lighting transformation, by the ambient lighting engine, of a pixel in the base graphics component using an ambient source indicating ambient colors surrounding the pixel in one or more of x, y, and z coordinate directions to generate an ambient-lit graphics component; and
   displaying the ambient-lit graphics component on a display of a computing device.

2. The method of claim 1, wherein the ambient source is a cached ambient source indicating ambient light surrounding the base graphics component in the graphical 3D space.

3. The method of claim 1, wherein the ambient source is calculated based on ambient light surrounding the base graphics component in the graphical 3D space.

4. The method of claim 3, further comprising:
   storing the ambient source in a cache.

5. The method of claim 1, wherein the ambient source indicates a global ambient color.

6. An ambient lighting method, comprising:
   receiving, by an ambient lighting engine, a first base graphics component;
   receiving, by the ambient lighting engine, a second base graphics component;
   performing a lighting transformation, by the ambient lighting engine, of a first pixel in the first base graphics component using a first ambient source indicating ambient colors surrounding the first pixel in one or more of x, y, and z coordinate directions to generate a first ambient-lit graphics component;
   displaying the first ambient-lit graphics component on a display of a computing device;
   after the first ambient-lit graphics component has been generated, performing a lighting transformation, by the ambient lighting engine, of a second pixel in the second base graphics component using a second ambient source indicating ambient colors surrounding the second pixel in one or more of x, y, and z coordinate directions to generate a second ambient-lit graphics component; and
   displaying the second ambient-lit graphics component on a display of a computing device.

7. The method of claim 6, wherein the first ambient source is a cached ambient source indicating ambient light surrounding the first base graphics component in the graphical 3D space and the second ambient source is calculated based on ambient light surrounding the second base graphics component in the graphical 3D space.

8. The method of claim 6, wherein the second ambient source is a cached ambient source indicating ambient light surrounding the second base graphics component in the graphical 3D space and the first ambient source is calculated based on ambient light surrounding the first base graphics component in the 3D space.

9. The method of claim 6, wherein the first ambient source is a cached ambient source indicating ambient light surrounding the first base graphics component in graphical 3D space and the second ambient source is a cached ambient source indicating ambient light surrounding the second base graphics component in graphical 3D space.

10. The method of claim 6, wherein the first ambient source is calculated based on ambient light surrounding the first base graphics component in the graphical 3D space and the second ambient source is calculated based on ambient light surrounding the second base graphics component in the graphical 3D space.

11. A computing device, comprising:
    a memory; and
    a processing unit for executing instructions stored in the memory for performing the following steps:
      receiving, by an ambient lighting engine, a base graphics component;
      performing a lighting transformation, by the ambient lighting engine, of a pixel in the base graphics component using an ambient source indicating ambient colors surrounding the pixel in one or more x, y, and z coordinate directions to generate an ambient-lit graphics component; and
      displaying the ambient-lit graphics component on a display of a computing device.

12. The computing device of claim 11, wherein the ambient source is a cached ambient source indicating ambient light surrounding the base graphics component in the graphical 3D space.

13. The computing device of claim 11, wherein the ambient source is calculated based on ambient light surrounding the base graphics component in the graphical 3D space.

14. The computing device of claim 13, further comprising a cache for storing the ambient source.

15. The computing device of claim 11, wherein the ambient source indicates a global ambient color comprises ambient color.

16. A computing device, comprising:
    a memory; and
    a processing unit for executing instructions stored in the memory for performing the following steps:
      receiving, by an ambient lighting engine, a first base graphics component;
      receiving, by the ambient lighting engine, a second base graphics component;
      performing a lighting transformation, by the ambient lighting engine, of a first pixel in the first base graphics component using a first ambient source indicating ambient colors light surrounding the first pixel in one or more of the x, y, and z coordinate directions to generate a first ambient-lit graphics component;

displaying the first ambient-lit graphics component on a display of a computing device;

after the first ambient-lit graphics component has been generated, performing a lighting transformation, by the ambient lighting engine, of a second pixel in the second base graphics component using a second ambient source indicating ambient colors surrounding the second pixel in one or more of x, y, and z coordinate directions to generate a second ambient-lit graphics component; and displaying the second ambient-lit graphics component on a display of a computing device.

17. The computing device of claim 16, wherein the first ambient source is a cached ambient source indicating ambient light surrounding the first base graphics component in the graphical 3D space and the second ambient source is calculated based on ambient light surrounding the second base graphics component in the graphical 3D space.

18. The computing device of claim 16, wherein the second ambient source is a cached ambient source indicating ambient light surrounding the second base graphics component in the graphical 3D space and the first ambient source is calculated based on ambient light surrounding the first base graphics component in the 3D space.

19. The computing device of claim 16, wherein the first ambient source is a cached ambient source indicating ambient light surrounding the first base graphics component in the graphical 3D space and the second ambient source is a cached ambient source indicating ambient light surrounding the second base graphics component in the graphical 3D space.

20. The computing device of claim 16, wherein the first ambient source is calculated based on ambient light surrounding the first base graphics component in the graphical 3D space and the second ambient source is calculated based ambient light surrounding the second base graphics component in the graphical 3D space.

* * * * *